United States Patent [19]
Hardison

[11] Patent Number: 5,309,865
[45] Date of Patent: May 10, 1994

[54] BIRD FEEDER CONSTRUCTED OF METAL CYLINDERS

[76] Inventor: Stewart Hardison, P.O. Box 333, Bainbridge, N.Y. 13733

[21] Appl. No.: 74,330

[22] Filed: Jun. 9, 1993

[51] Int. Cl.[5] ............................................. A01K 39/00
[52] U.S. Cl. .................................................. 119/57.8
[58] Field of Search ................... 119/57.8, 57.9, 52.2, 119/52.3

[56] References Cited

U.S. PATENT DOCUMENTS

| | | | |
|---|---|---|---|
| 2,705,938 | 4/1955 | Greenough | 119/52.3 |
| 3,568,641 | 3/1971 | Kilham . | |
| 3,646,911 | 3/1972 | Parson | 119/57.8 |
| 4,356,793 | 11/1982 | Blasbalg | 119/57.9 |
| 4,829,934 | 5/1989 | Blasbalg | 119/57.8 |
| 5,044,319 | 9/1991 | Blasbalg . | |
| 5,062,388 | 11/1991 | Kilham | 119/52.2 |
| 5,123,380 | 6/1992 | Edwards . | |

FOREIGN PATENT DOCUMENTS

| | | | |
|---|---|---|---|
| 296944 | 5/1954 | Switzerland | 119/52.2 |
| 1289675 | 9/1972 | United Kingdom | 119/52.2 |

*Primary Examiner*—Gene Mancene
*Assistant Examiner*—Todd E. Manahan

[57] ABSTRACT

A bird feeder of tube shape has all components critical to providing delivery of seed to wild birds of metal construction. The bird feeder comprises a metal cylinder oriented vertically and suspended from a nearly circular metal hoop, the free ends of which attach near the top rim of the cylinder. The underside of the cylinder is plugged with a metal disc and the top of the cylinder is protected with a removable metal cover. A plurality of smaller metal cylinders oriented horizontally intersect the vertically oriented cylinder on its center line in a staggered vertically spaced relation, the intersecting points being round apertures equal to the outside diameter of the horizontal cylinders. These vertical and horizontal cylinders, being metal, are joined by a series of welds. The cylinders oriented horizontally are of such a length that their ends protrude conspicuously from the outside wall of the vertical cylinder, and are of such design that their ends are cut on an angle with the cut-away portions being on the underside of the tubes and extending well into the interior of the vertically aligned cylinder. The plurality of openings created by the intersections of the horizontal and vertical cylinders provides wild birds access to seed stored in the vertical cylinder.

2 Claims, 5 Drawing Sheets

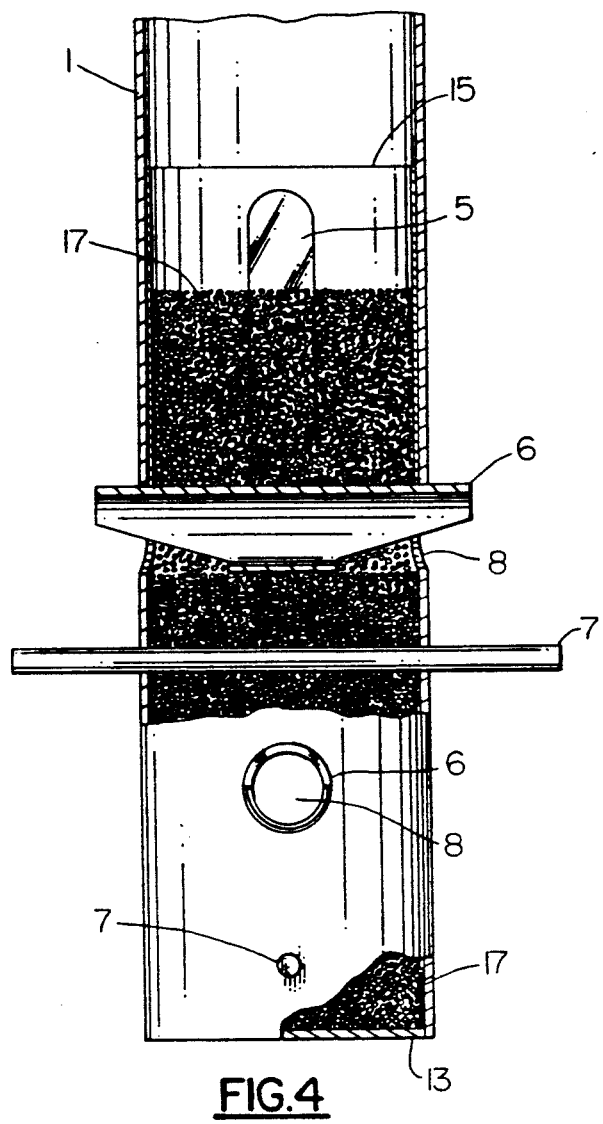
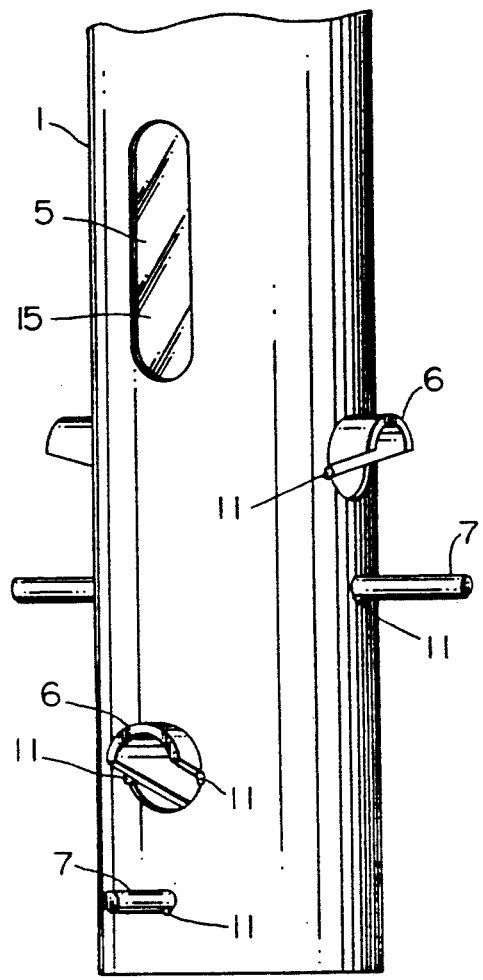
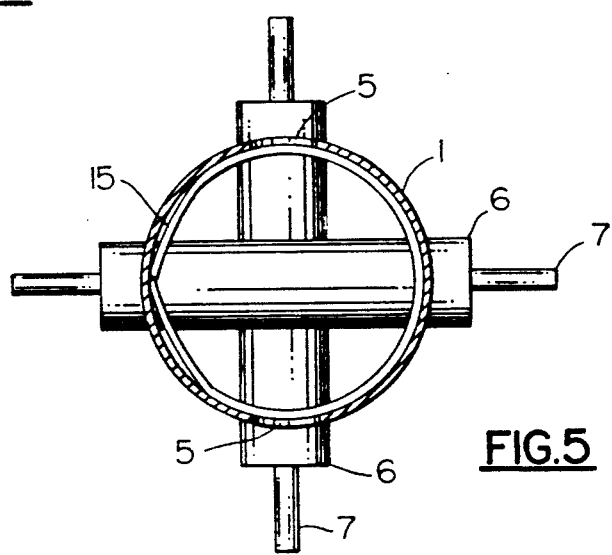
FIG.4
FIG.6
FIG.5

BIRD FEEDER CONSTRUCTED OF METAL CYLINDERS

BACKGROUND OF THE INVENTION

My invention is a tube feeder made of metal, with a locking cover and a plurality of feeding access holes, intended for use by small wild birds such as chickadees, warblers, finches, etc. While it is primarily intended for use by families and individuals, it may also be used by institutions such as zoos, arboretums and nursing homes in order to attract and feed wild birds. It can also be suspended inside large bird cages to allow caged birds to feed.

DISCUSSION OF PRIOR ART

Bird watching is currently one of the most popular hobbies in the United States. Since 1969, when the Droll Yankee Company introduced their tube feeder (U.S. Pat. No. 3,568,641), people with an interest in wild birds have been purchasing bird feeders of this design in order to attract birds to their back yards, gardens, or terraces. Tube feeders vary in height and diameter, and in their number of feeding access holes. The feeding access holes are designed in a variety of ways, but each functions in a manner that allows birds access to a reservoir of seed while preventing spillage of the seed.

Since the original Droll Yankees design (U.S. Pat. No. 3,568,641), tube feeders have been made principally of clear plastic material. These feeders (Including U.S. Pat. Nos. 5,123,380 and 5,044,319) were, and still are, subject to damage from squirrels, which often eat seed intended for birds. When frustrated, squirrels often gnaw on the plastic and metal parts of these feeders. Wherever they gnaw on the plastic, the squirrels can make large holes. These large holes destroy the bird feeding function of prior feeders because they allow the seed to spill. In addition, plastic tube feeders become dirty both inside and out with normal use. They are difficult to clean and for this reason they lose aesthetic as well as utilitarian value after a season or so of use.

My invention is a unique tube feeder because the main tube and all other components which are critical to its function of providing wild birds access to food are constructed of metal.

The main, or vertical, metal tube is intersected with smaller metal tubes. The main tube and the smaller ones are joined together by a plurality of welds and configured in a unique manner to create feeding access holes. Because the main tube and the tubes creating feeding access holes are made entirely of metal, squirrels and other animals cannot chew holes in them.

In addition, these metal components, unlike plastic ones, can be coated with a baked-on powder coated finish. This coating can be virtually any shade of color, from brilliant, high-gloss red to matte black. While adding significant easthetic properties to the bird feeder, this coating also has the advantage of being impervious to rain, ice and snow. It is also ultra violet stabilized to prevent the colors from fading by exposure to sunlight. And because of the smooth, baked-on finish, the bird feeder can be easily and thoroughly cleaned.

These properties allow my invention to be used for years without losing its functional or aesthetic value. In fact, under normal conditions the invention is so inherently durable that it can be considered a lifetime bird feeder for its owner. At the moment, my invention is the only existing bird feeder which combines function and aesthetics in this unique way.

OBJECTS AND ADVANTAGES

Accordingly, several objects and advantages of my invention are the following: durability, effective food storage and delivery, and lasting beauty.

Durability: Unlike existing tube feeders which are made principally of plastic, this bird feeder is made principally of metal. The main tube, which serves as the storage reservoir for seed, is intersected with metal tubes of smaller diameter. The length of these smaller tubes is greater than the outside diameter of the larger tube. Thus, the ends of the smaller tubes protrude from the outside wall of the large tube. The ends of these smaller tubes are cut at an angle. This angled cut extends into the interior of the large tube, creating access to seed. These smaller tubes are attached to the large tube by a plurality of welds. The metal of the large and small tubes, and the welds that join them, are stronger than the gnawing forces exerted by squirrels, raccoons, chipmunks, opossums or other animals known to damage and destroy plastic tube feeders.

Additionally, the cover for my bird feeder is made of metal, and it is locked onto the top of the bird feeder by a metal spring. The metal cover, and the metal spring that anchor it onto the top of the bird feeder, are also stronger than the gnawing forces exerted by squirrels and other animals.

The main tube has at least two vertically aligned slots which serve as viewing windows to allow the seed level to be checked. A window pane is formed by a single piece of transparent plastic which conforms to the inside circumference of the tube wall. Because this viewing pane is recessed from the curved surface of the outer tube wall, squirrels and other animals cannot find leverage to gnaw upon it and destroy it.

Because of these aforesaid objects and advantages, my invention can be considered absolutely safe from destruction by squirrels and other animals.

Moreover, field testing of my invention has repeatedly demonstrated that it withstands the stresses inflicted by gnawing squirrels and other animals, as well as the forces inflicted by weather, including direct sunlight, high wind, blowing rain, blowing snow, rain and snow that fall vertically, sub-zero Fahrenheit temperatures and temperatures in the 100 to 110 degree Fahrenheit range, with no loss of function whatsoever, even after one year of exposure to said forces.

Effective Storage and Delivery of Food: Wild birds need to eat almost constantly, especially during the cold months of the year, in order to stay alive. Therefore, people who enjoy feeding and observing wild birds need a bird feeder which holds an adequate food supply and which keeps the food supply dry. Once bird food, which is composed of various seeds such as millet and sunflower, becomes wet, harmful mold can grow. This can damage the nutritional value of the seed, and even endanger the health of birds which eat it. Damp, moldy seeds also have a tendency to bind together. This impedes the flow of the seed, which can degrade the functioning properties of previously known bird feeders. Damp seed can also freeze into a solid mass. When this happens, the functioning properties of said bird feeders cease altogether.

My invention holds an ample quantity (more than one quart) of bird seed, and it keeps this seed dry with three unique objects: a metal cover which locks securely, protective hoods which overhang the seed access holes and a metal bottom which is attached in a way that allows efficient drainage of moisture and circulation of air.

The cover is made of metal, and it overhangs the top rim of the bird feeder. This cover creates an impervious barrier to moisture in frozen or liquid form. Attached to the underside of the cover is a metal spring. This spring is configured in a manner that allows it to engage, through rotational turning, the ends of a handle which protrude inside the tube. Thus engaged, the cover is locked securely and cannot be removed by squirrels or other animals.

Above each seed access hole, there is an overhanging metal hood (formed by the protruding end of an intersecting metal tube) which serves as a protective awning. This hood accords protection to the seed from mist, rain, drizzle, snow, sleet, hail or other precipitation that falls vertically from the sky, or which falls at a diagonal slant when propelled by blowing wind.

The bottom of the bird feeder is covered by a metal disc. This metal disc is very slightly smaller than the inside diameter of the vertical tube, to which it is attached by a plurality of welds. The relative difference between the total diameter of the metal disc and the inside diameter of the vertical tube is such that seed is prevented from spilling, while trace amounts of liquid moisture are allowed to pass through. This liquid moisture, a by-product of natural condensation, is common to all bird feeders employed out-of-doors. Because the bird feeder utilizes a bottom disc that allows efficient drainage, as well as the circulation of air, which promotes drying, the seed is not contaminated by naturally occurring condensation, or by falling precipitation which enters the feeding access holes on a diagonal slant under extreme weather conditions. In short, the seed inside my invention stays drier than in other tube type feeders presently available.

Lasting Beauty: One characteristic of prior tube feeders which are constructed principally of plastic is that the plastic tubes become cloudy and stained with normal use. Detritus from seed coats the plastic tube from the inside, and this causes the clear plastic to become progressively more opaque. After a few months of normal use, this build-up of detritus causes the once clear plastic to appear a dirty gray, opaque color.

Because the main tube of my invention is made of metal, the normal build-up of detritus which occurs on the inside of the tube wall does not show through. Thus, the bird feeder is not subject to the aesthetic degrading that is normally associated with bird feeders of the clear plastic, tube design.

In addition, the exterior surface of my invention can be covered with a baked-on powder coated finish. This finish accords the advantage of being very hard and smooth, which makes it easy to clean with ordinary detergent and warm water.

Field testing with functioning prototypes has demonstrated that after a year's use—whereby it was exposed to the natural elements of sun, wind, rain, snow and sleet, as well as spattering from bird droppings—my invention can be readily and easily washed and made to appear virtually indistinguishable from one that is new.

DESCRIPTION OF THE DRAWINGS

FIG. 4 is a fragmentary elevational view in section showing feeding station used in my invention.

FIG. 5 is a sectional view looking down at said feeding station.

FIG. 6 is an oblique view of said feeding station.

Figure 1:
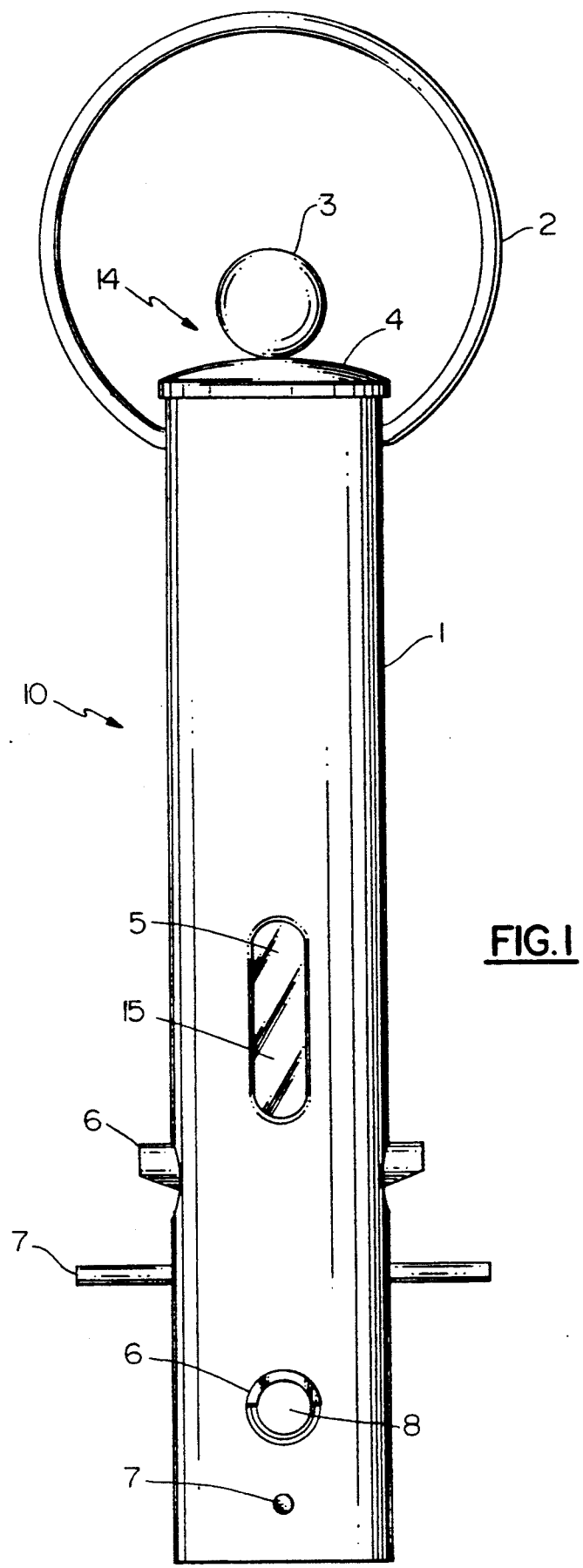
FIG. 1 is an elevational view of a bird feeder constructed in accordance with my invention.
Figure 2:
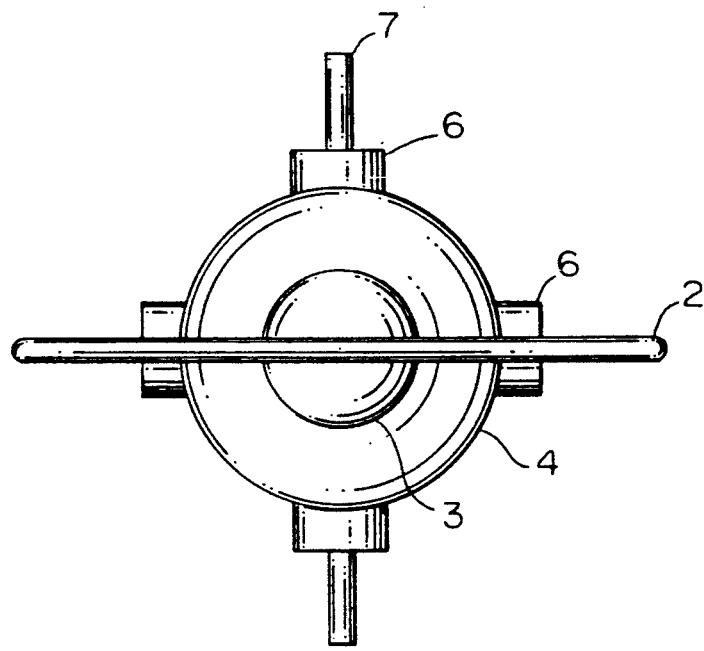
FIG. 2 is a top view thereof.
Figure 3:
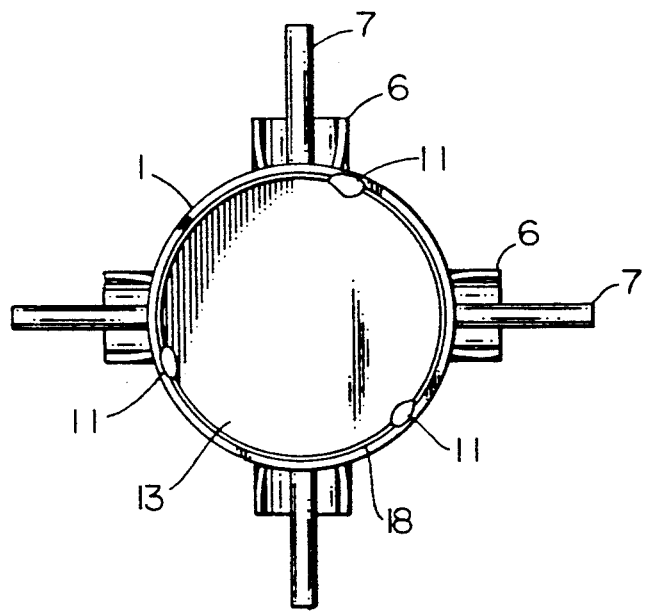
FIG. 3 is a bottom view thereof.

LIST OF REFERENCE NUMERALS 1. main tube, of metal
2. metal handle
3. spherical plastic knob
4. metal lid
5. oval aperture
6. secondary tube, of metal
7. metal rod
8. round aperture
9. metal bolt
10. bird feeder
11. a weld
12. metal spring
13. metal disc
14. cover assembly
15. transparent plastic sheet
16. round hole
17. bird seed
18. concentric space

SUMMARY

This invention is a unique tube design bird feeder because all components critical to its function are constructed of metal, which makes it safe from destruction by squirrels and other animals. In addition, the feeding access holes are comprised in a manner that accords protective hoods, or overhangs, which serve to keep the seed drier than in other tube type feeders presently available. A further advantage is that my invention can be coated with a baked-on finish to ensure durability and lasting beauty.

DESCRIPTION OF THE INVENTION

Referring to the drawings, and more particularly to the form of my invention shown in FIGS. 1 through 11, there is shown generally at 10 a bird feeder comprising a hollow cylindrical tube 1 constructed of metal. The tube 1 has a bottom 13 in the form of a circular disc, also constructed of metal, which is inset into the bottom of tube 1 as best viewed in FIG. 3. The bottom 13 is rigidly secured to tube 1 with a plurality of welds 11. Bottom 13 is situated in such a way as to create a small concentric space 18 between the bottom 13 and tube 1. This concentric space 18 is small enough to prevent the spillage of seed, but large enough to allow the drainage of moisture and circulation of air, features which help keep the seed dry.

Proceeding upward from bottom 13, there is a metal rod 7 which intersects tube 1. Rod 7 is of such a length that the ends of it diametrically protrude from tube 1. Rod 7 provides diametrically opposed perching positions for birds. This configuration is best seen in FIGS. 4, and 6. Rod 7 is held rigidly in place by a weld 11 which connects it to tube 1, as seen in FIG. 6.

Proceeding upward from Rod 7, there is a metal tube 6 which also intersects tube 1. Tube 6 is of such a length that the ends of it diametrically protrude from tube 1. Each end of tube 6 is cut away at an angle. This angled cut is best seen in FIGS. 4 and 6. The cut away portion of tube 6 extends into the interior space of tube 1. The portion of tube 6 which is not cut away comprises the top of said tube. This solid top portion prevents bird seed 17 from spilling outward from a round aperture 8. Aperture 8 provides access to bird seed 17, as seen in FIG. 4. Tube 6 is secured to Tube 1 by a plurality of welds 11, as seen in FIG. 6.

Approximately midway between top and bottom of tube 1 are diametrically opposed, vertically aligned oval apertures 5. These openings are covered from within tube 1 by a transparent plastic sheet 15. This plastic sheet is rectangular, with a height sufficient to completely cover the oval apertures 5. This configuration is best seen in FIGS. 4 and 5. Because plastic sheet 15 is resilient, and because its length is slightly less than the inside circumference of tube 1, it can be formed to fit snugly against the inside curvature of tube 1, as seen in FIG. 5. The bottom portion of plastic sheet 15 rests on the top of the uppermost tube 6. This positioning, combined with its natural resilience, holds plastic sheet 15 firmly in place, as best seen in FIGS. 4 and 5.

The aforesaid oval apertures 5 serve as windows through which the seed level can be monitored.

The plastic sheet 15 protects the seed within tube 1 from the effects of weather. Because plastic sheet 15 is recessed within tube 1, there is no way for squirrels and other animals to gain the leverage to chew upon and destroy plastic sheet 15.

Figure 8:
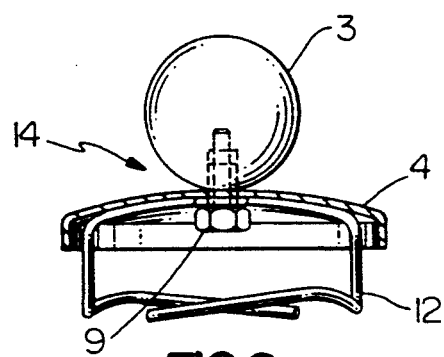
FIG. 8 is a fragmentary elevational view in section showing the cover which fits onto the top of my invention.

The top of tube 1 is provided with a cover assembly 14. Cover assembly 14 comprises a metal lid 4. This lid has a center hole through which a metal bolt 9 engages a spherical plastic knob 3, which is situated on the top of lid 4. Bolt 9 also engages a metal spring 12 which is situated on the underside of lid 4. This configuration is best seen in FIG. 8.

Figure 7:
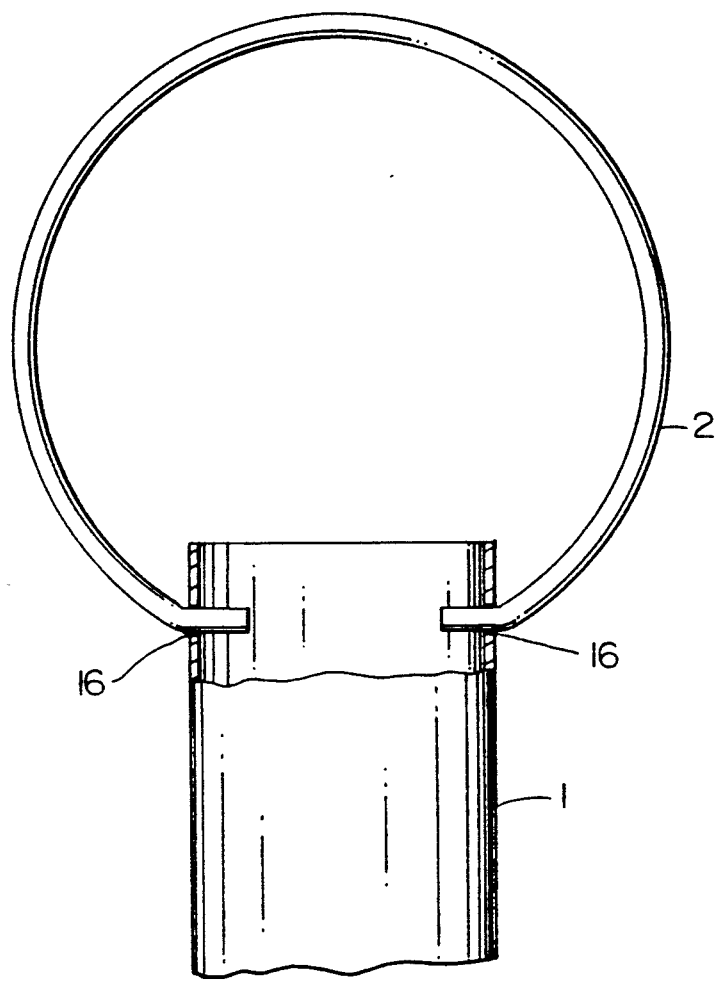
FIG. 7 is an elevational view of handle attached to main tube of bird feeder.
Figure 9:
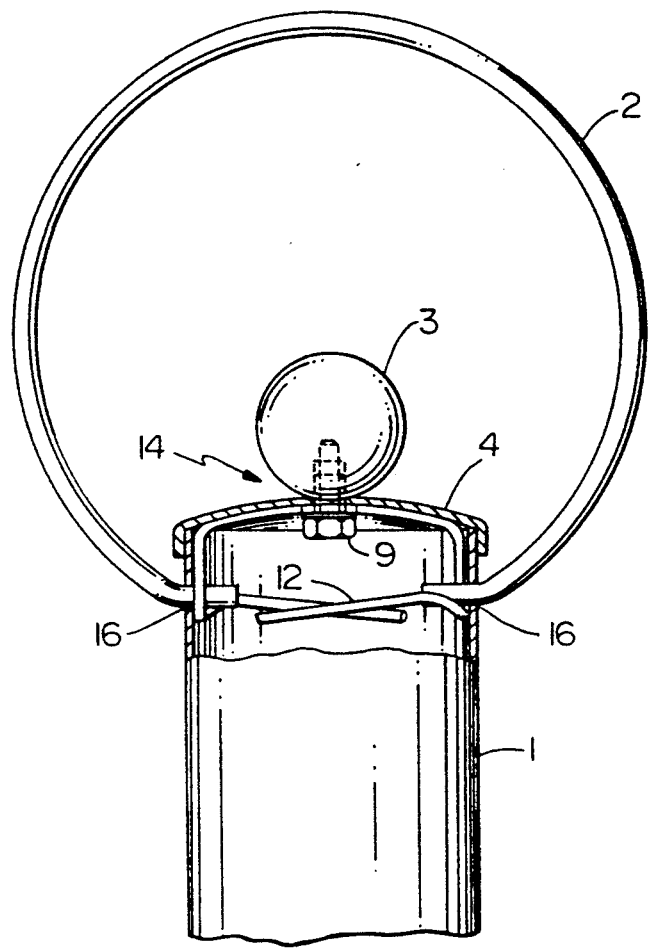
FIG. 9 is a fragmentary elevational view in section of said cover in the retained, or locked, position atop my invention.

At the top of tube 1 are two diametrically opposed holes 16, through which the free ends of a handle 2 are inserted. This configuration is best shown in FIGS. 7 and 9.

Figure 10:
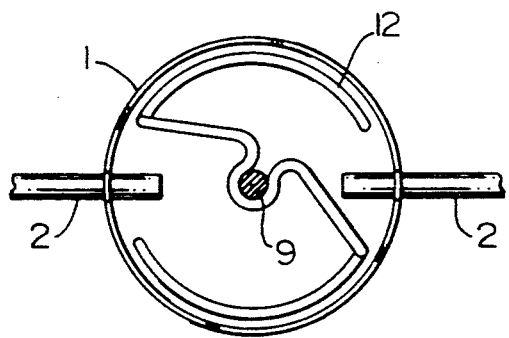
FIG. 10 is a top view showing alignment of metal spring before the cover is turned clockwise to achieve a retained position.
Figure 11:
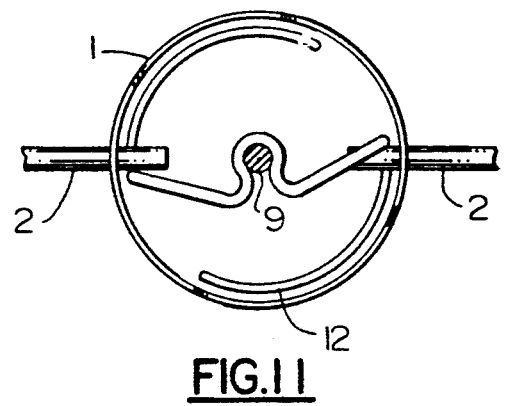
FIG. 11 is another top view showing alignment of metal spring with cover in the retained position.

Cover assembly 14 can be lowered onto the top rim of tube 1 by aligning metal spring 12 in a way to avoid interference with free ends of handle 2. This alignment is seen in FIG. 10. Thus aligned, cover 14 can be turned in a clockwise direction until the leading ends of the horizontally aligned portion of metal spring 12 engage and tighten against the free ends of handle 2. Metal spring 12 is configured in such a way that the its horizontally aligned end portions pass under the free ends of handle 2. When the vertically aligned portions of metal spring 12 meet and stop against the protruding free ends of handle 2, the cover assembly 14 may be considered to be in retained, or locked position, thus providing protection from incursions by squirrels and other animals that pilfer bird feeders. This retained position, and the sequence whereby it is attained, is seen in FIGS. 9, 10, and 11.

I claim:

1. A bird feeder comprising a metal cylinder oriented vertically and suspended from a nearly circular metal hoop, the free ends of which attach near the top rim of said cylinder, whereas the underside of said cylinder is plugged with a metal disc and the top of said cylinder is protected with a removable metal cover, a plurality of smaller metal cylinders oriented horizontally which intersect the vertical one on its center line in a staggered vertically spaced relation, the intersecting points being round apertures equal to the outside diameter of the horizontal cylinders, whereby said cylinders are of such a length that their ends protrude from the outside wall of the vertical cylinder and of such design that their ends are cut on an angle with the cut away portions being on the underside of said tubes and extending into the interior of the vertically aligned tube, whereby the intersection points of the horizontal and vertical cylinders provide access to bird seed stored in the vertical cylinder.

2. In the feeder of claim 1, said metal cover comprises a metal lid with center hole through which a metal bolt engages a spherical plastic knob situated on the top of said metal lid and a metal spring situated on the underside of said metal lid, whereby the metal cover can be lowered onto the top rim of bird feeder in such alignment as to avoid interference with free ends of metal hoop handle, where said free ends protrude inside the interior of vertical cylinder comprising main tube of bird feeder, so that metal cover can be turned in a clockwise direction until the metal spring engages and locks against the free ends of hoop handle, thereby securing the cover in a locked position to effectively protect the bird feeder from incursions by squirrels and other animals.

* * * * *